(12) United States Patent
Fujii et al.

(10) Patent No.: US 7,820,294 B2
(45) Date of Patent: Oct. 26, 2010

(54) TOUCH PANEL AND METHOD OF MANUFACTURING THE SAME

(75) Inventors: Shoji Fujii, Osaka (JP); Kenichi Matsumoto, Osaka (JP); Koji Tanabe, Osaka (JP)

(73) Assignee: Panasonic Corporation, Osaka (JP)

( * ) Notice: Subject to any disclaimer, the term of this patent is extended or adjusted under 35 U.S.C. 154(b) by 716 days.

(21) Appl. No.: 11/746,762

(22) Filed: May 10, 2007

(65) Prior Publication Data

US 2007/0273568 A1 Nov. 29, 2007

(30) Foreign Application Priority Data

May 23, 2006 (JP) ............................. 2006-142495
May 23, 2006 (JP) ............................. 2006-142496
May 23, 2006 (JP) ............................. 2006-142497

(51) Int. Cl.
*B32B 33/00* (2006.01)
(52) U.S. Cl. ..................................... 428/411.1; 323/904
(58) Field of Classification Search ....................... None
See application file for complete search history.

(56) References Cited

U.S. PATENT DOCUMENTS

2001/0000961 A1\* 5/2001 Hikida et al. ................ 345/173

FOREIGN PATENT DOCUMENTS

JP 2006-107015 4/2006

\* cited by examiner

*Primary Examiner*—Ramsey Zacharia
(74) *Attorney, Agent, or Firm*—RatnerPrestia

(57) ABSTRACT

A touch panel includes a light-transmittable upper substrate, a light-transmittable upper resistor layer on a lower surface of the upper substrate, a light-transmittable lower substrate, a light-transmittable lower resistor layer on an upper surface of the lower substrate, an adhesive layer on an upper surface of the upper substrate, and a light-transmittable plate on the adhesive layer. The upper substrate is made of material having oxygen and nitrogen removed therefrom. The lower resistor layer faces the upper resistor layer by a distance. The light-transmittable plate disables oxygen and nitrogen to pass through the plate substantively. Even being used in high temperatures, this touch panel does not produce an air bubble in the adhesive layer, hence allowing a user to clearly view a display device through the touch panel.

2 Claims, 4 Drawing Sheets

TOUCH PANEL AND METHOD OF MANUFACTURING THE SAME

FIELD OF THE INVENTION

The present invention relates to a touch panel arranged to be mounted onto a display screen of a display device for controlling various electronic apparatuses, and to a method of manufacturing the touch panel.

BACKGROUND OF THE INVENTION

Various electronic apparatuses, such as mobile telephones and car navigation systems, have been recently improved in functional performance and versatility. Such electronic apparatuses are accordingly equipped with light-transmittable touch panels mounted on display screens of display devices, such as liquid crystal displays. Users activate the touch panels with fingers or pens while viewing the screens of the display devices through the touch panels for switching functions of the electronic apparatuses. The touch panels have been accordingly demanded to be activated easily while allowing the display devices to be clearly viewed through the touch panels.

FIG. 8 is a cross sectional view of conventional touch panel 501 disclosed in Japanese Patent Laid-Open Publication No. 2006-107015. Upper substrate 1 is made of film of light-transmittable, insulating resin, such as polycarbonate. Lower substrate 2 is made of film of light-transmittable, insulating resin. Upper resistor layer 3 made of light-transmittable, resistor material, such as indium tin oxide, is provided on a lower surface of the upper substrate 1. A lower resistor layer 4 made of light-transmittable, resistor material, such as indium tin oxide, is provided on an upper surface of the lower substrate 2. Dot spacers 12 made of insulating resin are provided on an upper surface of the lower resistor layer 4 by equal intervals. A pair of upper electrodes are provided at both ends of the upper resistor layer 3, respectively, and arranged along a predetermined direction. A pair of lower electrodes are provided at both ends of the lower resistor layer 4, respectively, and arranged along a direction perpendicular to the predetermined direction along which the upper electrodes are arranged. Spacer 5 having substantially a frame shape is coated with adhesives on upper and lower surfaces or one of the surfaces. The adhesives adhere upper substrate 1 to lower substrate 2 via spacer 5, thus allowing the upper resistor layer 3 and the lower resistor layer 4 to face each other by a distance.

Polarizing plate 6 includes a polyvinyl alcohol sheet which contains iodine or dye and which is orientated, and tri-acetyl cellulose layers provided on upper and lower surfaces of the sheet. Polarizing plate 6 is bonded with adhesive layer 7 to the upper surface of upper substrate 1, thus providing touch panel 501.

Touch panel 501 is mounted onto a display screen of a display device, such as a liquid crystal display, and has the upper and lower electrodes connected to an electronic circuit of an electronic apparatus.

A user presses polarizing plate 6 with a finger of his/hers or a pen while viewing the display screen of the display device through touch panel 501. Upper substrate 1 accordingly sags together with polarizing plate 6, and causes a portion of upper resistor layer 3 under the pressed portion to contact lower resistor layer 4.

The electronic circuit applies a voltage between the upper electrodes, and detects a potential at the potion of the upper resistor layer 3 contacting the lower resistor layer 4 through lower resistor layer 4 and the lower electrodes. The electronic circuit further applies a voltage between the lower electrodes, and detects a potential at the portion of the upper resistor layer 3 contacting lower resistor layer 4 through upper resistor layer 3 and the upper electrodes. The electronic circuit then determines the position of the pressed portion based on the detected potentials. The electronic apparatus switches functions according to the determined position.

Upon receiving external light, such as sunlight or illumination, on an upper surface of polarized plate 6, polarizing plate 6 converts the external light into light polarized along either an X-direction or a Y-direction perpendicular to the X-direction. The polarized light has intensity substantially half of that of the external light. The polarized light is transmitted from the polarizing plate 6 to the upper substrate 1. The polarized light passes through upper substrate 1, and then reflected by lower resistor layer 4. Since the reflected light has the intensity reduced substantially to the half with polarizing plate 6, light emitted from the upper surface of the polarizing plate 6 has small intensity. This allows the user to view the display screen of the display device without interference of the external light.

When conventional touch panel 501 is used under a hostile environment at high temperatures, e.g., in an automobile under direct sunlight, adhesive layer 7 may have air bubbles 8 produced inside. Air bubbles 8 reflect the external light, and accordingly prevent the user from viewing the display device clearly.

SUMMARY OF THE INVENTION

A touch panel includes a light-transmittable upper substrate, a light-transmittable upper resistor layer on a lower surface of the upper substrate, a light-transmittable lower substrate, a light-transmittable lower resistor layer on an upper surface of the lower substrate, an adhesive layer on an upper surface of the upper substrate, and a light-transmittable plate on the adhesive layer. The upper substrate is made of material having oxygen and nitrogen removed therefrom. The lower resistor layer faces the upper resistor layer by a distance. The light-transmittable plate disables oxygen and nitrogen to pass through the plate substantively.

Even being used in high temperatures, this touch panel does not produce an air bubble in the adhesive layer, hence allowing a user to clearly view a display device through the touch panel.

DETAIL DESCRIPTION OF THE PREFERRED EMBODIMENTS

Exemplary Embodiment 1

Figure 8:
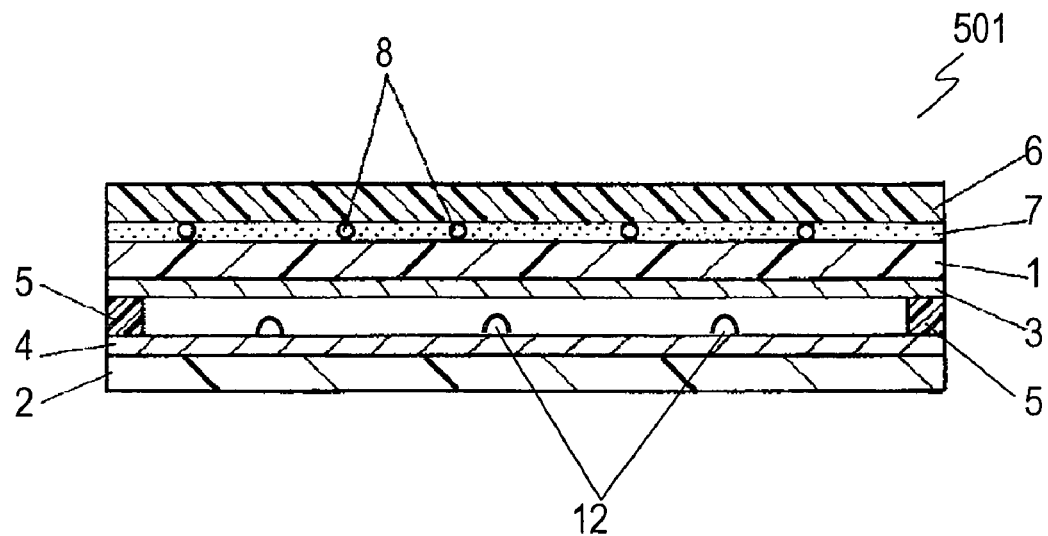
FIG. 8 is a cross sectional view of a conventional touch panel.

A cause due to which conventional touch panel 501 shown in FIG. 8 produced air bubbles 8 in adhesive layer 7 was studied. According to the study, it was confirmed experimentally that air bubbles 8 mainly contained oxygen and nitrogen, and were produced from upper substrate 1 at high temperatures. It was further confirmed that upper substrate 1 absorbed oxygen and nitrogen easily and discharged oxygen and nitrogen in high temperatures, and upper resistor layer 3 and polarizing plate 6 disables oxygen or nitrogen to pass through upper resistor layer 3 and polarizing plate 6, hence causing air bubbles 8 of the discharged oxygen and nitrogen to be stored in adhesive layer 7.

Figure 1:
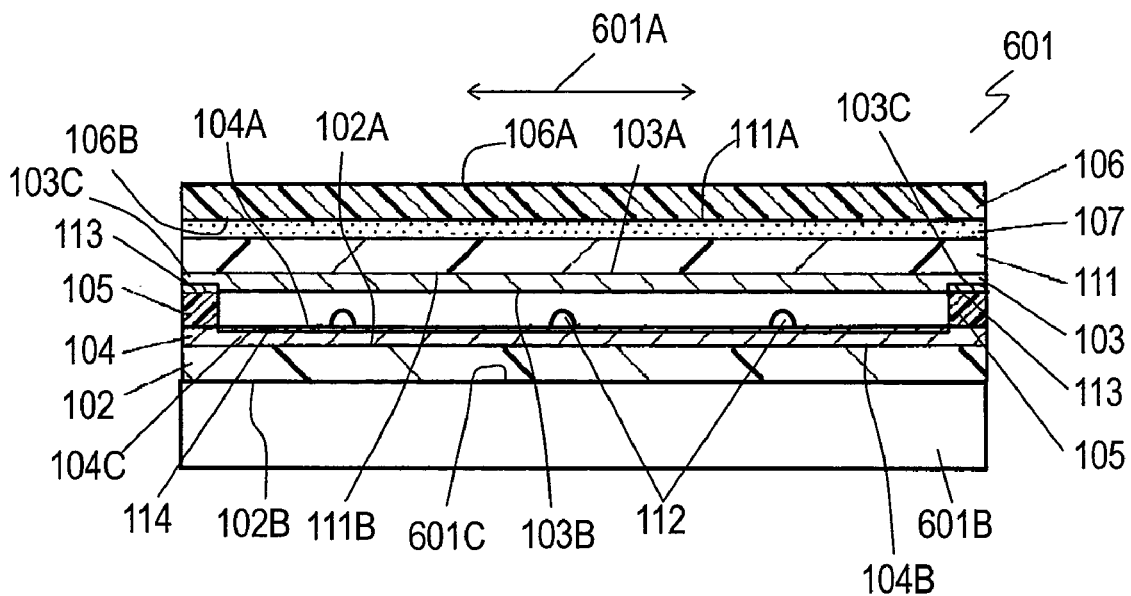
FIG. 1 is a cross sectional view of a touch panel according to Exemplary Embodiment 1 of the present invention.

FIG. 1 is a cross sectional view of touch panel 601 according to Exemplary

Embodiment 1 of the present invention. Upper substrate 111 is made of film of light-transmittable, insulating resin. Lower substrate 102 is made of light transmittable, insulating resin. Upper resistor layer 103 made of light transmittable, resistor material, such as indium tin oxide, is formed by, e.g. sputtering, on lower surface 111B of upper substrate 111. Lower resistor layer 104 made of light transmittable, resistor material, such as indium tin oxide, is formed by, e.g. sputtering, on upper surface 102A of lower substrate 102. Plural dot spacers 112 made of insulating resin are provided on upper surface 104A of the lower resistor layer 104 at equal intervals. A pair of upper electrodes 113 are provided at both ends 103C of upper resistor layer 103 (having upper surface 103*a* and lower surface 103*b*), respectively, and are arranged along predetermined direction 601A. A pair of lower electrodes 114 are provided at both ends 104C of lower resistor layer 104 (having upper surface 104*a* and lower surface 104*b*), respectively, and are arranged along a direction perpendicular to direction 601A. An adhesive, such as an acrylic adhesive or a rubber adhesive, applied on upper and lower surfaces or one of the surfaces of spacer 105 having substantially a frame shape adheres respective circumferences of upper substrate 111 and lower substrate 102 to each other via spacer 105, thus allowing lower surface 103B of upper resistor layer 103 and upper surface 104A of lower resistance layer 104 to face each other by a distance. Adhesive layer 107 made of adhesive, such as acrylic adhesive or rubber adhesive, is provided on upper surface 111A of upper substrate 111. Light-transmittable polarizing plate 106 has lower surface 106B coupled via adhesive layer 107 to upper surface 111A of upper substrate 111, thus providing touch panel 601.

Figure 2:
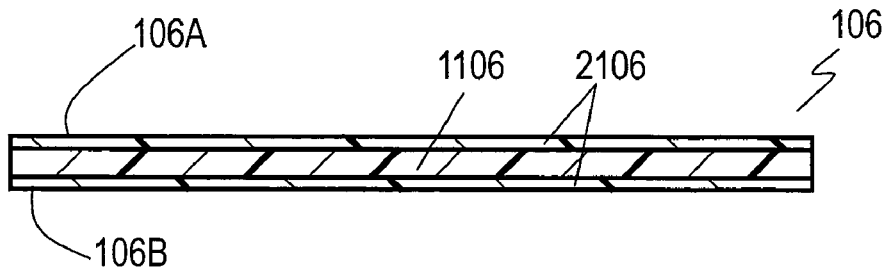
FIG. 2 is a cross sectional view of a polarizing plate of the touch panel according to Embodiment 1.

FIG. 2 is a cross sectional view of polarizing plate 106. Polarizing plate 106 is flexible and includes polyvinyl alcohol sheet 1106 and tri-acetyl cellulose sheets 2106 on upper and lower surfaces of sheet 1106, respectively. Sheet 1106 is formed by stretching polyvinyl alcohol film impregnated with iodine or dye and oriented.

Upper substrate 111 is made of insulating resin, such as poly-ether sulfone or polycarbonate, which is light-transmittable and optically isotropic. This insulating resin may absorb and contain a large amount of oxygen and nitrogen. Upper substrate 111 is made of material prepared by removing the oxygen and nitrogen from this insulating resin to reduce the amount of oxygen and nitrogen therein.

A method of manufacturing touch panel 601 will be described below.

A resistor material of upper resistor layer 103 is deposited on a resin sheet of upper substrate 111 by, e.g. sputtering. The resin sheet is then cut into upper substrate 111 having a predetermined size and having upper resistor layer 103 deposited thereon. Then, upper resistor layer 103 is stored for a predetermined time while being heated to a predetermined temperature in order to remove oxygen and nitrogen from upper substrate 111. More particularly, upper substrate 111 is stored, for example, in a high-temperature container at 80° C. for three hours or in a high-temperature container at 150° C. for fifteen minutes.

Then, upper substrate 111, lower substrate 102 having lower resistor layer 104 deposited thereon, dot spacers 112, spacer 105, adhesive layer 107, and polarizing plate 106 are provided to assemble touch panel 601.

Upon being left in room temperatures for a long time, upper substrate 111 which has been heated to the predetermined temperature and stored for the predetermined time to remove the oxygen and nitrogen absorbs oxygen and nitrogen again from the atmosphere. Upper substrate 111 is joined to polarizing plate 106 with adhesive layer 107 within 2 to 3 hours after being heated to the predetermined temperature and stored for the predetermined time to remove the oxygen and nitrogen. Since polarizing plate 106 and upper resistor layer 103 disable oxygen and nitrogen to pass through them substantially, polarizing plate 106 and upper resistor layer 103 covers upper surface 111A and lower surface 111B of the upper substrate 111, respectively, thereby preventing upper substrate 111 from again absorbing oxygen and nitrogen.

Touch panel 601 is mounted to an electronic apparatus, such that lower surface 102B of lower substrate 102 is mounted onto display screen 601C of display device 601B, such as a liquid crystal display, and upper electrode 113 and lower electrode 114 are connected to an electronic circuit of the electronic apparatus.

A user presses upper surface 106A of polarizing plate 106 with a finger or a pen while viewing display screen 601B of display device 601B through touch panel 601. This pressing causes upper substrate 111 and upper resistor layer 103 to sag together with polarizing plate 106, and accordingly, causes a portion of upper resistor layer 103 which sags accordingly to contact lower resistor layer 104.

The electronic circuit applies a voltage between upper electrodes 113, and detects, through lower resistor layer 104 and lower electrodes 114, a potential appeared at the portion of upper resistor layer 103 contacting lower resistor layer 104. The electronic circuit also applies a voltage between lower electrodes 114, and detects, through upper resistor layer 103 and upper electrodes 113, a potential appeared at the portion of upper resistor layer 103 contacting lower resistor layer 104. The electronic circuit determines the position of the pressed portion based on the detected potentials. The electronic apparatus switches its functions according to the determined position.

When external light, such as sunlight or illumination light, enters onto upper surface 106A of polarizing plate 106, polarizing plate 106 converts the external light into light polarized along either an X-direction or a Y-direction perpendicular to the X-direction. The polarized light has intensity substantially half of that of the external light. The polarized light is transmitted from polarizing plate 106 to upper substrate 111. The polarized light passing through upper substrate 111 is then reflected by lower resistor layer 104. The reflected light has intensity reduced to substantially half of that of the external light, and hence, the light emitted from upper surface 106A of polarizing plate 106 has small intensity. The user accordingly views display screen 601C of display device 601B through touch panel 601 clearly while less disturbed by the external light.

Since upper substrate 111 is made of the material having the amount of oxygen and nitrogen reduced, touch panel 601 does not discharge oxygen or nitrogen even when being used in high temperatures. Thus, even when touch panel 601 is used in high temperatures, for example, in an automobile under direct sunlight, adhesive layer 107 stores no air bubble, thus allowing the user to clearly view display screen 601C of display device 601B through touch panel 601.

A so-called linear polarization reflection prevention is described above in which the reflection of the external light entering onto upper surface 106A of polarizing plate 106 is prevented by polarizing plate 106 mounted onto upper surface 111A of upper substrate 111. Alternatively, touch panel 601 according to Embodiment 1 may have a so-called circular polarization type reflection prevention performed by a ¼-wavelength phase shifter plate provided between polarizing plate 106 and upper substrate 111 and another ¼-wavelength phase shifter plate provided on lower surface 102B of the lower substrate 102. These phase shifter plates prevent the reflection of the external light, and allow the user to view display device 601B through touch panel 601 more clearly.

Exemplary Embodiment 2

Figure 3:
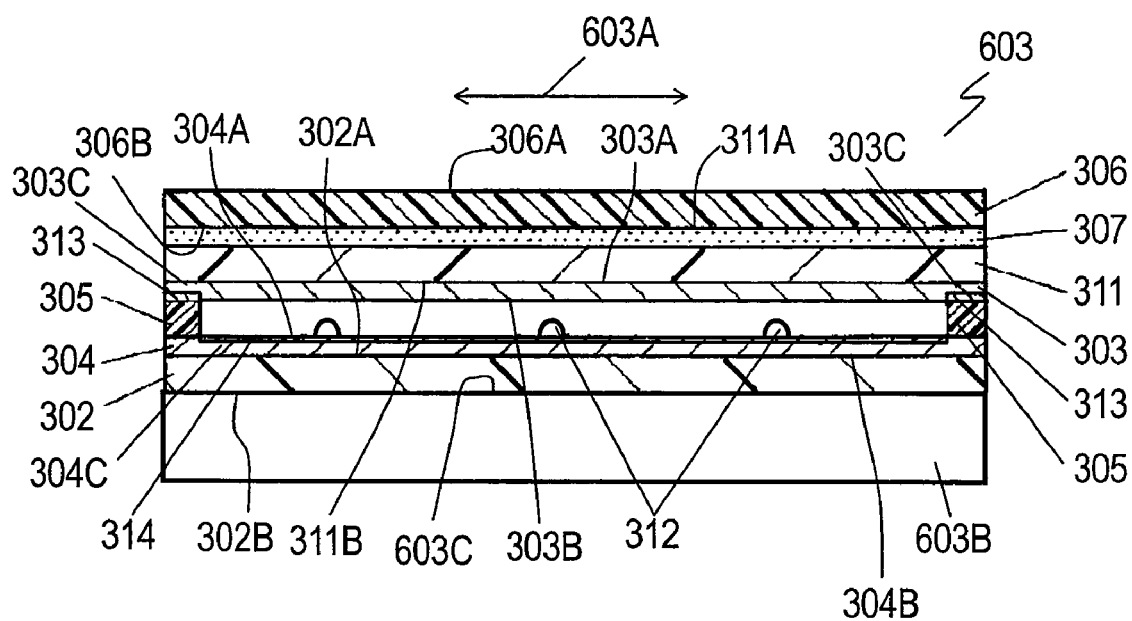
FIG. 3 is a cross sectional view of a touch panel according to Exemplary Embodiment 2 of the invention.

FIG. 3 is a cross sectional view of touch panel 603 according to Exemplary Embodiment 2 of the present invention. Upper substrate 311 is made of film of light-transmittable, insulating resin. Lower substrate 302 is made of light transmittable, insulating resin. Upper resistor layer 303 (having upper surface 303a and lower surface 303b) made of light transmittable, resistor material, such as indium tin oxide, is formed by, e.g. sputtering, on lower surface 311B of upper substrate 311. Lower resistor layer 304 (having upper surface 304a and lower surface 304b) made of light transmittable, resistor material, such as indium tin oxide, is formed by, e.g. sputtering, on upper surface 302A of lower substrate 302. Plural dot spacers 312 made of insulating resin are provided on upper surface 304A of the lower resistor layer 304 at equal intervals. A pair of upper electrodes 313 are provided at both ends 303C of upper resistor layer 303, respectively, and are arranged along predetermined direction 603A. A pair of lower electrodes 314 are provided at both ends 304C of lower resistor layer 304, respectively, and are arranged along a direction perpendicular to direction 603A. An adhesive, such as an acrylic adhesive or a rubber adhesive, applied on upper and lower surfaces or one of the surfaces of spacer 305 having substantially a frame shape adheres respective circumferences of upper substrate 311 and lower substrate 302 to each other via spacer 305, thus allowing lower surface 303B of upper resistor layer 303 and upper surface 304A of lower resistance layer 304 to face each other by a distance. Adhesive layer 307 made of adhesive, such as acrylic adhesive or rubber adhesive, is provided on upper surface 311A of upper substrate 311. Light-transmittable polarizing plate 306 has lower surface 306B coupled via adhesive layer 307 to upper surface 311A of upper substrate 311, thus providing touch panel 603.

Figure 4:
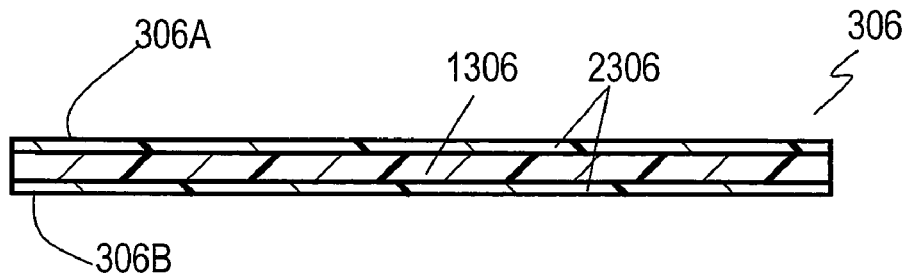
FIG. 4 is a cross sectional view of a polarizing plate of the touch panel according to Embodiment 2.

FIG. 4 is a cross sectional view of polarizing plate 306. Polarizing plate 306 is flexible and includes polyvinyl alcohol sheet 1306 and tri-acetyl cellulose sheets 2306 on upper and lower surfaces of sheet 1306, respectively. Sheet 1306 is formed by stretching polyvinyl alcohol film impregnated with iodine or dye and oriented.

Upper substrate 311 is made of insulating resin, such as poly-ether sulfone or polycarbonate, which is light-transmittable and optically isotropic. This insulating resin may absorb and contain a large amount of oxygen and nitrogen. Upper substrate 311 is made of material prepared by replacing the oxygen and nitrogen with water, thus removing the oxygen and nitrogen.

A method of manufacturing touch panel 603 will be described below.

A resistor material of upper resistor layer 303 is deposited on a resin sheet of upper substrate 311 by, e.g. sputtering. The resin sheet is then cut into upper substrate 311 having a predetermined size and having upper resistor layer 303 deposited thereon. Then, upper resistor layer 303 is stored for a predetermined time while being heated to a predetermined temperature and being humidified in a predetermined humidity so as to replace the oxygen and nitrogen contained upper substrate 311 with water. More particularly, upper substrate 311 is stored in a high-temperature/high-humidity container, for example, at about 40° C. for twenty-four hours in a humidity ranging from 90% RH to 95% RH.

Then, upper substrate 311, lower substrate 302 having lower resistor layer 304 deposited thereon, dot spacers 312, spacer 305, adhesive layer 307, and polarizing plate 306 are provided to assemble touch panel 603.

Even upon being left in a room temperature, upper substrate 311 which has been heated to the predetermined temperature, humidified in the predetermined humidity, and stored for the predetermined time to replace the oxygen and nitrogen with water absorbs few amount of oxygen and nitrogen again from the atmosphere. Upper substrate 311 is joined to polarizing plate 306 with adhesive layer 307 within a short time after being heated to the predetermined temperature, humidified in the predetermined humidity, and stored for the predetermined time to replace the oxygen and nitrogen with water. Since polarizing plate 306 and upper resistor layer 303 disable oxygen and nitrogen to pass through them substantially, polarizing plate 306 and upper resistor layer 303 covers upper surface 311A and lower surface 311B of the upper substrate 311, respectively, thereby preventing upper substrate 311 from again absorbing oxygen and nitrogen.

Touch panel 603 is mounted to an electronic apparatus, such that lower surface 302B of lower substrate 302 is mounted onto display screen 603C of display device 603B, such as a liquid crystal display, and upper electrode 313 and lower electrode 314 are connected to an electronic circuit of the electronic apparatus.

A user presses upper surface 306A of polarizing plate 306 with a finger or a pen while viewing display screen 603B of display device 603B through touch panel 603. This pressing causes upper substrate 311 and upper resistor layer 303 to sag together with polarizing plate 306, and accordingly, causes a portion of upper resistor layer 303 which sags accordingly to contact lower resistor layer 304.

The electronic circuit applies a voltage between upper electrodes 313, and detects, through lower resistor layer 304 and lower electrodes 314, a potential appeared at the portion of upper resistor layer 303 contacting lower resistor layer 304. The electronic circuit also applies a voltage between lower electrodes 314, and detects, through upper resistor layer 303 and upper electrodes 313, a potential appeared at the portion of upper resistor layer 303 contacting lower resistor layer 304. The electronic circuit determines the position of the pressed portion based on the detected potentials. The electronic apparatus switches its functions according to the determined position.

When external light, such as sunlight or illumination light, enters onto upper surface 306A of polarizing plate 306, polarizing plate 306 converts the external light into light polarized along either an X-direction or a Y-direction perpendicular to the X-direction. The polarized light has intensity substantially half of that of the external light. The polarized light is transmitted from polarizing plate 306 to upper substrate 311. The polarized light passing through upper substrate 311 is then reflected by lower resistor layer 304. The reflected light has intensity reduced to substantially half of that of the external light, and hence, the light emitted from upper surface 306A of polarizing plate 306 has small intensity. The user accordingly views display screen 603C of display device 603B through touch panel 603 clearly while less disturbed by the external light.

The molecule of water is smaller than respective molecules of oxygen and nitrogen. Polarizing plate 306 can pass the molecule of water or steam while disabling the molecule of oxygen or nitrogen to pass through plate 306. Upper substrate 311 is made of material prepared by replacing the oxygen and nitrogen therein with water, touch panel 603 would discharge water or steam but not oxygen or nitrogen when being used at high temperatures. The molecules of water or steam pass through adhesive layer 307 and polarizing plate 306 and are discharged to the outside of touch panel 603. Thus, even when touch panel 603 is used in high temperatures, for example, in an automobile under direct sunlight, adhesive layer 307 stores no air bubble, thus allowing the user to clearly view display screen 603C of display device 603B through touch panel 603.

A so-called linear polarization reflection prevention is described above in which the reflection of the external light entering onto upper surface 306A of polarizing plate 306 is prevented by polarizing plate 306 mounted onto upper surface 311A of upper substrate 311. Alternatively, touch panel 603 according to Embodiment 2 may have a so-called circular polarization type reflection prevention performed by a ¼-wavelength phase shifter plate provided between polarizing plate 306 and upper substrate 311 and another ¼-wavelength phase shifter plate provided on lower surface 302B of the lower substrate 302. These phase shifter plates prevent the reflection of the external light, and allow the user to view display device 603B through touch panel 603 more clearly.

Exemplary Embodiment 3

Figure 5:
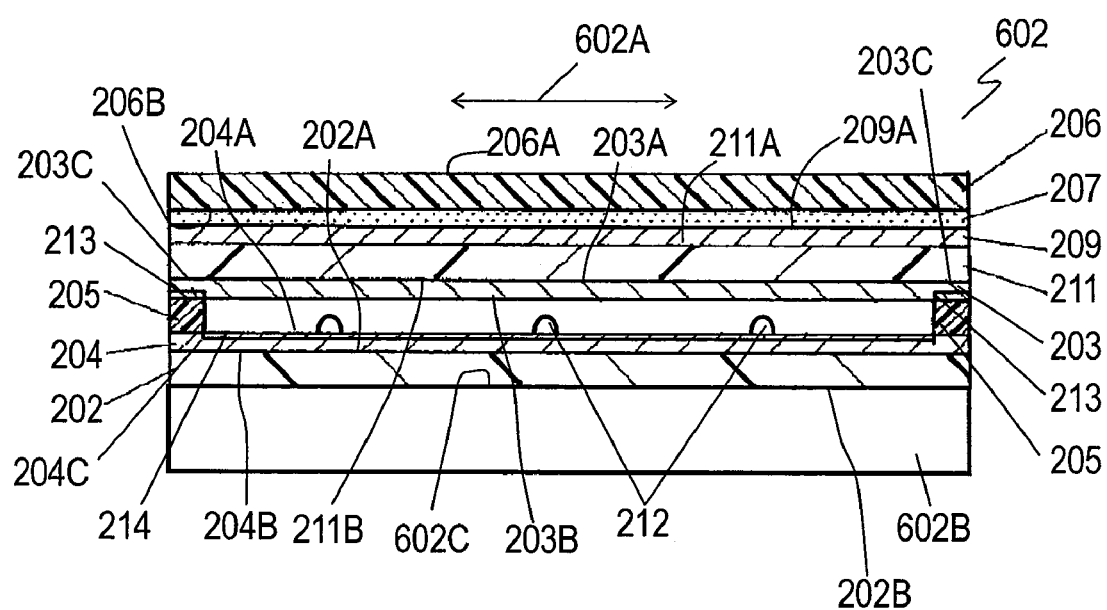
FIG. 5 is a cross sectional view of a touch panel according to Exemplary Embodiment 3 of the invention.

FIG. 5 is a cross sectional view of touch panel 602 according to Exemplary Embodiment 3 of the present invention. Upper substrate 211 is made of film of light-transmittable, insulating resin. Lower substrate 202 is made of light transmittable, insulating resin. Upper resistor layer 203 (having upper surface 203a and lower surface 203b) made of light transmittable, resistor material, such as indium tin oxide, is formed by, e.g. sputtering, on lower surface 211B of upper substrate 211. Lower resistor layer 204 (having upper surface 204a and lower surface 204b) made of light transmittable, resistor material, such as indium tin oxide, is formed by, e.g. sputtering, on upper surface 202A of lower substrate 202. Plural dot spacers 212 made of insulating resin are provided on upper surface 204A of the lower resistor layer 204 at equal intervals. A pair of upper electrodes 213 are provided at both ends 203C of upper resistor layer 203, respectively, and are arranged along predetermined direction 602A. A pair of lower electrodes 214 are provided at both ends 204C of lower resistor layer 204, respectively, and are arranged along a direction perpendicular to direction 602A. An adhesive, such as an acrylic adhesive or a rubber adhesive, applied on upper and lower surfaces or one of the surfaces of spacer 205 having substantially a frame shape adheres respective circumferences of upper substrate 211 and lower substrate 202 to each other via spacer 205, thus allowing lower surface 203B of upper resistor layer 203 and upper surface 204A of lower resistance layer 204 to face each other by a distance. Light-transmittable gas barrier layer 209 is provided on upper surface 211A of upper substrate 211. Adhesive layer 207 made of adhesive, such as acrylic adhesive or rubber adhesive, is provided on upper surface 209A of gas barrier layer 209. Light-transmittable polarizing plate 206 has lower surface 206B coupled via adhesive layer 207 to upper surface 209A of gas barrier layer 209, thus providing touch panel 602.

Gas barrier layer 209 is deposited by a vapor deposition method or a sputtering method using inorganic oxide, such as silica, titanium oxide, alumina, or indium tin oxide, or inorganic nitride, such as silicon nitride. Upper surface 211A and lower surface 211B of upper substrate 211 are covered with gas barrier layer 209 and upper resistor layer 203, respectively.

Figure 6:
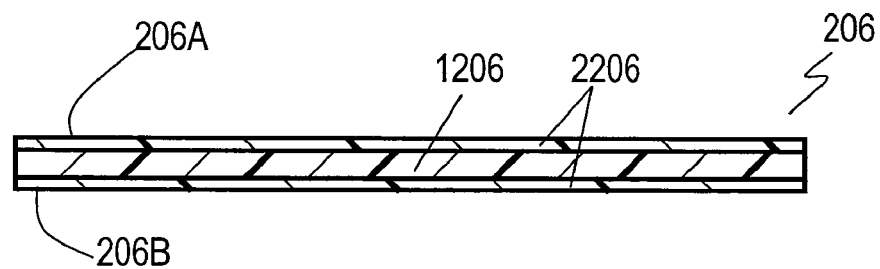
FIG. 6 is a cross sectional view of a polarizing plate of the touch panel according to Embodiment 3.

FIG. 6 is a cross sectional view of polarizing plate 206. Polarizing plate 206 is flexible and includes polyvinyl alcohol sheet 1206 and tri-acetyl cellulose sheets 2206 on upper and lower surfaces of sheet 1206, respectively. Sheet 1206 is formed by stretching polyvinyl alcohol film impregnated with iodine or dye and oriented.

Touch panel 602 is mounted to an electronic apparatus, such that lower surface 202B of lower substrate 202 is mounted onto display screen 602C of display device 602B, such as a liquid crystal display, and upper electrode 213 and lower electrode 214 are connected to an electronic circuit of the electronic apparatus.

A user presses upper surface 206A of polarizing plate 206 with a finger or a pen while viewing display screen 602B of display device 602B through touch panel 602. This pressing causes upper substrate 211 and upper resistor layer 203 to sag together with polarizing plate 206, and accordingly, causes a portion of upper resistor layer 203 which sags accordingly to contact lower resistor layer 204.

The electronic circuit applies a voltage between upper electrodes 213, and detects, through lower resistor layer 204 and lower electrodes 214, a potential appeared at the portion of upper resistor layer 203 contacting lower resistor layer 204. The electronic circuit also applies a voltage between lower electrodes 214, and detects, through upper resistor layer 203 and upper electrodes 213, a potential appeared at the portion of upper resistor layer 203 contacting lower resistor layer 204. The electronic circuit determines the position of the pressed portion based on the detected potentials. The electronic apparatus switches its functions according to the determined position.

When external light, such as sunlight or illumination light, enters onto upper surface 206A of polarizing plate 206, polarizing plate 206 converts the external light into light polarized along either an X-direction or a Y-direction perpendicular to the X-direction. The polarized light has intensity substantially half of that of the external light. The polarized light is transmitted from polarizing plate 206 to upper substrate 211. The polarized light passing through upper substrate 211 is then reflected by lower resistor layer 204. The reflected light has intensity reduced to substantially half of that of the external light, and hence, the light emitted from upper surface 206A of polarizing plate 206 has small intensity. The user accordingly views display screen 602C of display device 602B through touch panel 602 clearly while less disturbed by the external light.

Upper substrate 211 is made of insulating resin, such as poly-ether sulfone or polycarbonate, which is light-transmittable and optically isotropic. This insulating resin may absorb and contain a large amount of oxygen and nitrogen. Gas barrier layer 209 disables oxygen and nitrogen to pass through layer 209. Accordingly, even when touch panel 602 is used in high temperatures, gas barrier layer 209 prevents the oxygen and nitrogen contained in upper substrate 211 from entering into adhesive layer 207. Even when touch panel 602 is used in high temperatures, for example, in an automobile under direct sunlight, adhesive layer 207 stores no air bubble, thus allowing the user to clearly view display screen 602C of display device 602B through touch panel 602.

Gas barrier layer 209 may be formed by coating upper surface 201A of upper substrate 201 with organic resin, such as acrylic resin. Gas barrier layer 209 made of the organic resin prevents gas of oxygen and nitrogen from entering from upper substrate 211 to adhesive layer 207 although its effect is lower than the layer made of the inorganic oxide. Gas barrier layer 209 made of the inorganic oxide has a density higher that of the layer made of the organic oxide, and accordingly blocks the gas effectively.

A so-called linear polarization reflection prevention is described above in which the reflection of the external light entering onto upper surface 206A of polarizing plate 206 is prevented by polarizing plate 206 mounted onto upper surface 211A of upper substrate 211. Alternatively, touch panel 602 according to Embodiment 3 may have a so-called circular polarization type reflection prevention performed by a ¼-wavelength phase shifter plate provided between polarizing plate 206 and upper substrate 211 and another ¼-wavelength phase shifter plate provided on lower surface 202B of the lower substrate 202. These phase shifter plates prevent the reflection of the external light, and allow the user to view display device 602B through touch panel 602 more clearly.

Figure 7:
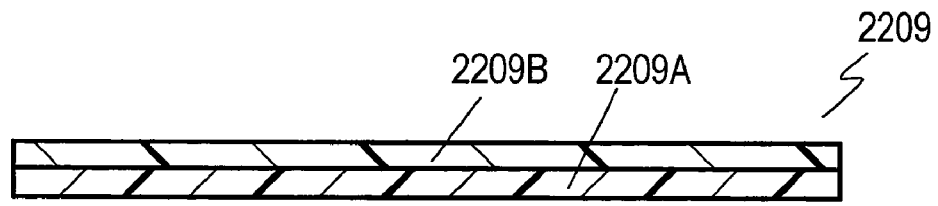
FIG. 7 is a cross sectional view of a gas barrier layer of the touch panel according to Embodiment 3.

FIG. 7 is a cross sectional view of another gas barrier layer 2209 according to Embodiment 3 which can be used in stead of gas barrier layer 209. Gas barrier layer 209 shown in FIG. 5 is a single layer of inorganic oxide. Gas barrier layer 2209 shown in FIG. 7 includes a first layer 2209A provided on upper surface 211A of upper substrate 211 and a second layer 2209B provided on first layer 2209A. Adhesive layer 207 is provided on second layer 2209B. First layer 2209A and second layer 2209B are made of inorganic oxides different from each other. The oxides are selected from silica, titanium oxide, niobium oxide, copper oxide, and tin oxide. Gas barrier layer 2209 not only prevents oxygen and nitrogen from being discharged but also prevents light from reflecting on upper surface 2209A by absorbing the external light received on polarizing plate 207. This allows the user to clearly view the display screen of the display device through touch panel 602 including gas barrier layer 2209. Gas barrier layer 2209 may include more than two layers of made of inorganic oxides different from each other. These layers may not necessarily be made of inorganic oxides different from each other. At least layers adjacent to each other out of the layers may be made of inorganic oxides different from each other.

What is claimed is:

1. A touch panel comprising:
   an upper substrate being light-transmittable and having an upper surface and a lower surface;
   an upper resistor layer being light-transmittable and being provided on the lower surface of the upper substrate;
   a lower substrate being light-transmittable and having an upper surface and a lower surface;
   a lower resistor layer being light-transmittable and being provided on the upper surface of the lower substrate, the lower resistor layer facing the upper resistor layer by a distance;
   an adhesive layer coupled to the upper surface of the upper substrate; and
   a plate being light-transmittable and being provided on the adhesive layer, the plate disabling oxygen and nitrogen to pass through the plate substantively, wherein
   the upper substrate is made of material having oxygen and nitrogen removed therefrom and replaced with water
   the plate allows molecules of water to pass through the plate; and
   the adhesive layer is provided on the upper surface of the upper substrate.

2. The touch panel according to claim 1, wherein the plate comprises a polarizing plate.

* * * * *